3,679,441
Patented July 25, 1972

3,679,441
CERAMIC PRODUCT FROM FLY ASH AND METHOD OF MAKING SAME
Kelsey L. Harvey, 1098 5th St., Beaver, Pa. 15009
No Drawing. Continuation-in-part of application Ser. No. 640,519, May 23, 1967. This application Oct. 1, 1970, Ser. No. 77,322
Int. Cl. C04b 33/00
U.S. Cl. 106—41      3 Claims

ABSTRACT OF THE DISCLOSURE

The invention relates to a ceramic product comprising the waste ash material obtained from coal-burning industrial power and other plants, and to the method of producing the same. Essentially, the invention is a process for producing a substitute for conventional clay or shale ceramic products with properties at least equivalent to those products by the use of very near to 100% of the waste ash material normally called fly ash, bottom ash, clinker, etc.

---

This application is a continuation-in-part of my co-pending application Ser. No. 640,519, filed May 23, 1967, and now abandoned.

Heretofore, it has been well known that waste products such as fly ash have been utilized for making ceramic products, in the cement industry, in the brick industry, etc. However, the general use of this material has not become widespread because the processes proposed heretofore have been relatively complicated and expensive, and the products made utilizing fly ash, for example, have been generally inferior to those equivalent products made from substances such as concrete, clay, or shale. Further, the economics of handling the fly ash as a waste material in the dry state is quite difficult, and the mixing thereof with a binder to form a matrix has always been a problem. Further, heretofore it has not been possible to utilize almost 100% fly ash as previous processes have used fly ash primarily as a filler.

Therefore, it is the general object of the present invention to overcome and avoid the foregoing and other difficulties and objections to prior art practices by providing a method to make ceramic products from a composition of nearly 100% waste ash caused by burning coal or coal derivitives by allowing substantially complete interfacial bonding of the ash particles to occur upon vitrification during firing.

Another object of the invention is to produce a ceramic body utilizing waste by-products resultant from the burning of coal at power and industrial plants by utilizing manufacturing methods similar to those employed for the conventional type of ceramic material, but which body during its production into the ceramic product is characterized by low shrinkage during the drying and firing times, by reduced firing times, and by increased available vitrification range.

The aforesaid objects of the invention are achieved by utilizing a process to produce a ceramic article possessing properties making it available for uses where clay and shale ceramic products are employed comprising in the form of a shaped, dense ceramic structure, at least about 90% fly ash particles by weight bound by interfacial fusion to each other caused by the fly ash approaching or becoming vitrious during firing, and less than 10% by weight of a suitable plasticizer which holds the fly ash together for drying and firing, but does not interfere with the interfacial fusion therebetween, nor provide any binding action after firing.

The novel improvement in the instant process and product formed thereby is believed to reside in the recognition of the fact that in essence no binding material at all is necessary to the final product to help or assist the fly ash particles in binding to themselves by interfacial fusion occurring during vitrification upon firing thereof at proper temperature. All prior art in this field has required a matrix or flux of some type or a combination of some other material with the fly ash to achieve the matrix in which the fly ash is bonded to itself and to the matrix. However, the instant invention eliminates the necessity of any binder or matrix in combination with the fly ash, but rather utilizes a complete bond of the fly ash to itself by interfacial fusion, so as to simplify the process of making the fly ash, and provides a cheaper and better resultant product. For example, the process and product defined in U.S. Patent No. 2,576,565 utilizes coal ash slag in combination with fly ash to achieve a matrix wherein the final vitrified product comprises at least about 80% fly ash. In other words, the coal ash slag serves as a binder or matrix which is not necessary in the instant invention.

In essence, the ceramic product of the invention is theoretically 100% fly ash since only a temporary plasticizer is utilized to hold the non-fired fly ash in desired molded configuration, and which temporary plasticizer is nearly completely burned off or gassified during the firing allowing a full bonding or interfacial fusing between the fly ash particles to occur during the firing phase of the process.

DESCRIPTION OF THE PROCESS

The following description will be with relation to making brick, but it should be understood that the process of the invention is suitable for making any ceramic type product from a fly ash base before firing which would possess sufficient moldability or plasticity to be formed into self-supporting ceramic shapes by conventional ceramic-making equipment, and subject to drying and firing in the usual manner. Essentially, the invention contemplates the use of a good, clean fly ash, that is one which is substantially carbon-free, does not have any combined water, and is of such particle size that there are enough contact points between adjacent particles to achieve an interfacial bind of sufficient strength to hold the composite in shape after firing. It should be understood, however, that the fly ash does not have to be carbon free or clean. This would depend on the end product. In essence this includes a particle size so fine that it is almost colloidal, up to perhaps 4 mesh per inch as a top size, although the particle sizes in one composite may vary widely as long as there will be sufficient moldability to the mix as more fully defined below. In other words, finer particles of fly ash can be dispersed throughout with larger particles to form a moldable mix which can be formed into a very dense and solidified product. Therefore, fly ash may, in most instances, be used directly without treatment to reduce the particle size, remove carbon, water, or any other undesirable elements.

Thus, assuming a good, clean fly ash in a substantially dry or damp condition as a starting material, the moldable mix is prepared by adding some type of plasticizer to simply hold the dry fly ash in shape. Water alone cannot achieve this effect except for the very small sizes now formed by sintering to produce lightweight aggregate such as that currently used by Consolidated Edison Company in New York. Thus, it has been found that the addition of between 0.1% to 1% of a water soluble resin made by The B. F. Goodrich Chemical Company, Cleveland, Ohio, called "Carbopol" of either the 941 or 961 desigation serves as a plasticizer in combination with water to provide the desired plasticity and moldability when mixed with dry ash. Other plasticizers may be used in place of or in combination with Carbopol. Among the suitable plasticizers are common molasses, glycerin, flour, and shellac. It is an essential feature of the invention that the plasticizer be a material which is substantially burned off or vaporized during the firing of the molded fly ash so that interfacial bond occurs between the fly ash particles. The plasticizer serves merely to hold the fly ash in a workable mass which can be molded and handled.

The amount of water added with the Carbopol or other plasticizer will depend on the particle size and surface area of the fly ash, as well as the type of molding which will take place. For example, about 3% to 10% water by weight should be utilized if a pressing type molding operation is desired. A 5% to 15% water addition by weight for stiff mud or extruded molding, and between 12% to 25% water by weight for a soft mud molding which can't be extruded will meet the objects of the invention. If casting is desired, water content by weight should be increased to between 25% to 50%. In the formation of bricks, the extrusion method with cutting and trimming by wire is the method most frequently utilized, and in this instance, the invention contemplates that about 5% water by weight gives the optimum results.

While the preferred embodiment of the invention will incorporate Carbopol of about the percentage indicated, it should be quite clear that the percentage for the plasticizer material could be varied depending upon the properties of material it is desired to mold. The percentage given above would be suitable for molding a high quality brick. For a low quality brick, however, or one with course or rough texture, the size of the fly ash particles should be increased and other waste materials could be incorporated along with the fly ash to give the resultant brick more porosity, for use as filters, thermal insulation catalyst carriers, etc., or lighter weight as desired.

After the moldable mix is formed by mixing in a suitable drum so that there is a thorough intermixing of the water, fly ash, and Carbopol or other plasticizers, it is shaped by any suitable equipment, for example, a dry press or an extrusion machine. The use of modern vacuum type processes is ideally suited to the preparation and molding of products utilizing this mix.

The next step in the process then consists of drying the shaped masses, and may be accomplished, for example, by placing the wet forms on racks or cars passing through a tunnel dryer in which waste heat gasses might be employed to help evaporate the water. One of the unique characteristics of the preferred composite is the absence of appreciable shrinkage during the drying cycle, and this results in numerous manufacturing advantages and cost saving since the product can be dried very rapidly and the resulting dried material is substantially free from distortion, cracks, and breakage. Further, large size pieces or unusual shapes may be made in this manner with no substantial risk of dimensional change or breakage during drying.

However, it is quite important that the drying not take place too rapidly so as to cause a crusting or baking of the outer surface of the formed mix which would eliminate the release of water from the interior. Hence, it is contemplated that the utilization of infra-red heat which dries the formed mixes from the inside out might be best. Actually, for the purposes of the invention, drying can be accomplished at ambient temperature, or up to about 300° F., or higher, depending upon the particular consistency or shape of the material being formed, and the rapidity with which it is desired to have drying completed. For a regular 9" brick with the fly ash composition set forth above, a drying time of about 12 hours in an oven at 300° F. is contemplated.

As a feature of the invention, it has been found that if drying is begun at ambient temperature and gradually increased to the 300° F. temperature and is done within a humid atmosphere to prevent the surface from drying out, that the best drying results are accomplished. Hence, it is important to the drying process that the humidity in the drying oven be kept at least at 50% and preferably above 75% to achieve the proper drying results.

The last step in the process involves firing, and any source of heat to achieve the desired temperatures for the fly ash to become vitreous will achieve the objects of the invention. Specifically, a conventional tunnel kiln, core, or even a periodic kiln can be utilized. The bricks can be run as fast as desired into the heat because there is substantially no combined water in the material, and with the proper drying as set forth above, the firing can be accomplished in a minimum of about 6 hours, but can be fired for up until about 18 hours, at the proper temperature, without any damage. This compares with firing periods of between 5 to 8 days for normal clay and shale bricks, or longer depending on the type of kiln.

The same actual firing temperatures as utilized for shale or low grade clay brick will meet the desired temperature limits. For example, it is contemplated that firing between about 1900° F. to about 2300° F. will meet the objects of the invention. This temperature depends on the analysis of the ash but most of it fails in this range. The presence of carbon is the only limitation in this respect since with fly ash compositions having an unusually high carbon content some time must be consumed in burning this out before permitting the temperature of the kiln to rise to a point where vitrification starts.

Thus, it should be understood that the final brick formed by the process of the invention is one which has certainly more than 90% fly ash therein, and approaches between 95% and 100% fly ash. The vitrification of the fly ash upon firing causes interfacial fusion between adjacent particles wherever they are in contact, and hence results in an extremely strong composite of the fly ash itself without the utilization of any matrix or binder for the fly ash. As stated above, the approach to 100% fly ash because of the interfacial bonding with itself is what provides the improved composite material of the invention.

It has been found that in effect, then, the final brick formed represents in chemical analysis, nothing more than the fly ash from which it started, and this breaks down by chemical components substantially as follows:

Silica, $SiO_2$—between 34%–52%
Alumina, $Al_2O_3$—between 17%–31%
Iron oxide, $Fe_2O_3$—between 6%–26%
Calcium oxide, $CaO$—between 1%–10%
Magnesium oxide, $MgO$—between 0.5%–1.5%
Sulphur trioxide, $So_3$—between 0.5%–3%

Unburned extra materials sometimes present:

Phosphate, $P_2O_5$—between 0.25%–0.75%
Titanium oxide, $TiO_2$—between 1.0%–2.0%
Sodium oxide, $Na_2O$—between 0.25%–0.50%
Potassium oxide, $K_2O$—between 1.0%–2.0%

In effect, this invention recognizes that interfacial fusion can occur between the particles of fly ash directly without incorporation of any matrix, or catalytic agent to facilitate and enhance such fusion, even in large masses such as for making bricks, and the resultant product has great strength characteristics, lighter weight, and certainly lower cost than conventional clay or shale ceramic products. The refractory properties thereof also are enhanced. The feature of drying by slowly increasing temperature and in a humid atmosphere allows rapid firing and the vitrification and fusion desired.

While in accordance with the Patent Statutes, only one best known embodiment of the invention has been illustrated and described in detail it is to be particularly understood that the invention is not limited thereto or thereby,

What is claimed is:

1. A process for forming a shaped ceramic product having properties making it available for uses where clay and shale ceramic products are employed, which comprises preparing a moldable body comprising at least 90% substantially carbon-free fly ash, and water, and an organic plasticizer mixable with the water to form the fly ash into a plastic and moldable mix, forming the mix to a desired shape, drying the mix from the inside out in at least a 50% humid atmosphere, and firing the dried mix at a temperature of between 1900° Fahrenheit to 2300° Fahrenheit for between six hours to eighteen hours to provide interfacial fusion between substantially all the points of contact between adjacent fly ash particles.

2. A process according to claim 1 where the drying is accomplished at about 300° Fahrenheit with this temperature being brought up slowly from an ambient condition.

3. A product made according to the process of claim 1.

References Cited

UNITED STATES PATENTS

| | | | |
|---|---|---|---|
| 2,358,157 | 9/1944 | Gardner | 106—40 R |
| 2,463,994 | 3/1949 | Nichols et al. | 106—40 R |
| 2,576,565 | 11/1951 | Brown | 106—39 R |
| 2,946,112 | 7/1960 | Tucker et al. | 106—40 R |
| 2,987,411 | 6/1961 | Minnick | 106—41 |

OTHER REFERENCES

Kingery, W. D.: Introduction to Ceramics; New York (1960), pp. 375, 376, 386, 387.

Norton, F. H.: Elements of Ceramics; Cambridge, Mass. (1952), pp. 106–107.

Kingery, W. D.: Ceramic Fabrication Processes; New York (1958), p. 66.

TOBIAS E. LEVOW, Primary Examiner

W. R. SATTERFIELD, Assistant Examiner

U.S. Cl. X.R.:

264—44